United States Patent
Kage et al.

(12) 
(10) Patent No.: US 6,377,241 B1
(45) Date of Patent: Apr. 23, 2002

(54) DIRECTION INSTRUCTING APPARATUS DIRECTION ESTIMATING APPARATUS AND A COMPUTER-READABLE STORAGE MEDIUM CONTAINING A PROGRAM FOR THE SAME STORED THEREON

(75) Inventors: Hiroshi Kage; Eiichi Funatsu, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/295,412

(22) Filed: Apr. 21, 1999

(30) Foreign Application Priority Data

Jan. 21, 1999 (JP) .......................................... 11-013422

(51) Int. Cl.$^7$ ................................................ G09G 5/08
(52) U.S. Cl. ...................................... 345/158; 345/157
(58) Field of Search ................................ 345/156, 157, 345/158; 348/207

(56) References Cited

U.S. PATENT DOCUMENTS

| | | | | |
|---|---|---|---|---|
| 5,326,940 A | * | 7/1994 | Doubrava et al. ............ | 178/18 |
| 5,502,459 A | | 3/1996 | Marshall et al. ............ | 345/158 |
| 5,504,501 A | | 4/1996 | Hauck et al. ................ | 345/158 |
| 5,515,079 A | | 5/1996 | Hauck ......................... | 345/157 |
| 5,528,263 A | | 6/1996 | Platzker et al. ............. | 345/156 |
| 5,572,251 A | | 11/1996 | Ogawa ........................ | 348/207 |
| 5,786,804 A | | 7/1998 | Gordon ....................... | 345/158 |

FOREIGN PATENT DOCUMENTS

| | | |
|---|---|---|
| JP | 7234938 | 9/1995 |
| JP | 8242265 | 9/1996 |
| JP | 965195 | 3/1997 |
| JP | 9134250 | 5/1997 |

OTHER PUBLICATIONS

Kyuma et al., "Artificial Retinas—Fast, Versatile Image Processors", Nature, vol. 372, No. 6502, Nov. 1994, pp. 197–198.

* cited by examiner

Primary Examiner—Richard Hjerpe
Assistant Examiner—Kimnhung Nguyen
(74) Attorney, Agent, or Firm—Leydig, Voit, & Mayer, Ltd.

(57) ABSTRACT

A direction instructing apparatus includes an image inputting section for inputting data for a two-dimensional image picked up with an image sensor having an image processing function, a projection computing section for computing projections for the two-dimensional image as a whole in directions according to the data inputted into the image inputting section, a movement computing section for computing a one-dimensional movement vector for each projection according to the projection computed in the projection computing section, and a direction estimating section for estimating a two-dimensional movement vector for the two-dimensional image according to the one-dimensional movement vector computed in the movement computing section.

8 Claims, 11 Drawing Sheets

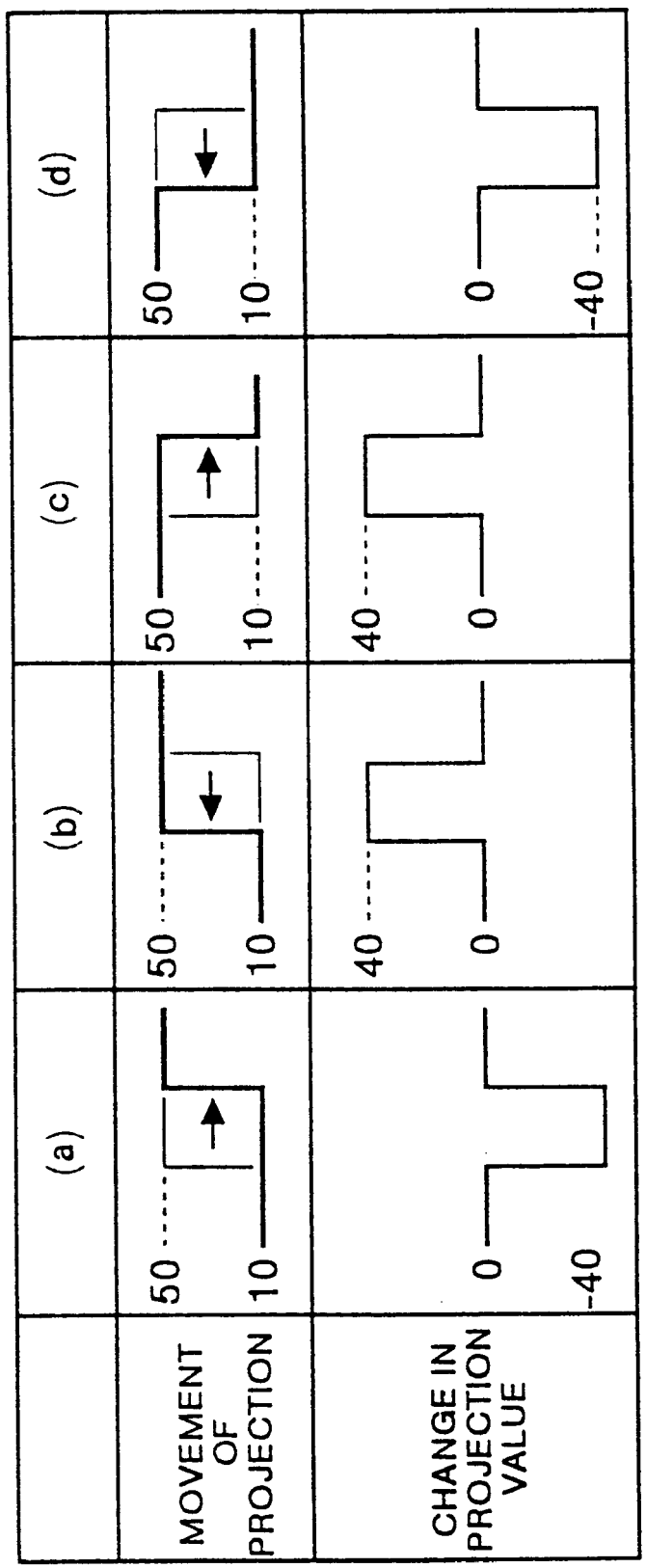

FIG.4A
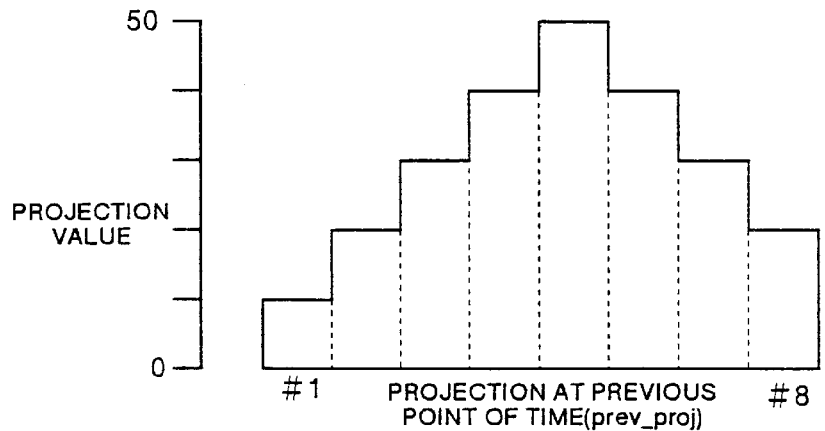
FIG.4B
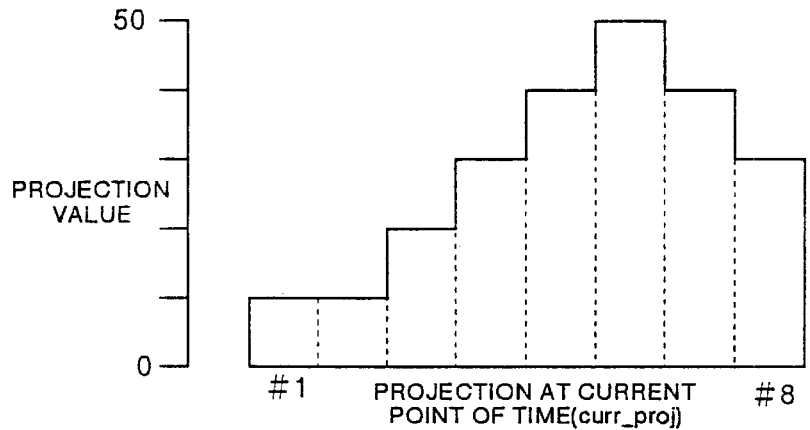
FIG.4C
| ARRAY ELEMENT No. | #1 | #2 | #3 | #4 | #5 | #6 | #7 | #8 |
|---|---|---|---|---|---|---|---|---|
| PREVIOUS POINT OF TIME (prev_proj) | 10 | 20 | 30 | 40 | 50 | 40 | 30 | 20 |
| CURRENT POINT OF TIME (curr_proj) | 10 | 10 | 20 | 30 | 40 | 50 | 40 | 30 |
| DIFFERENCE IN PROJECTION (diff_proj) | 0 | -10 | -10 | -10 | 10 | 10 | 10 | 10 |
| ESTIMATED DIRECTION (vect_proj) | | → | → | → | | → | → | |

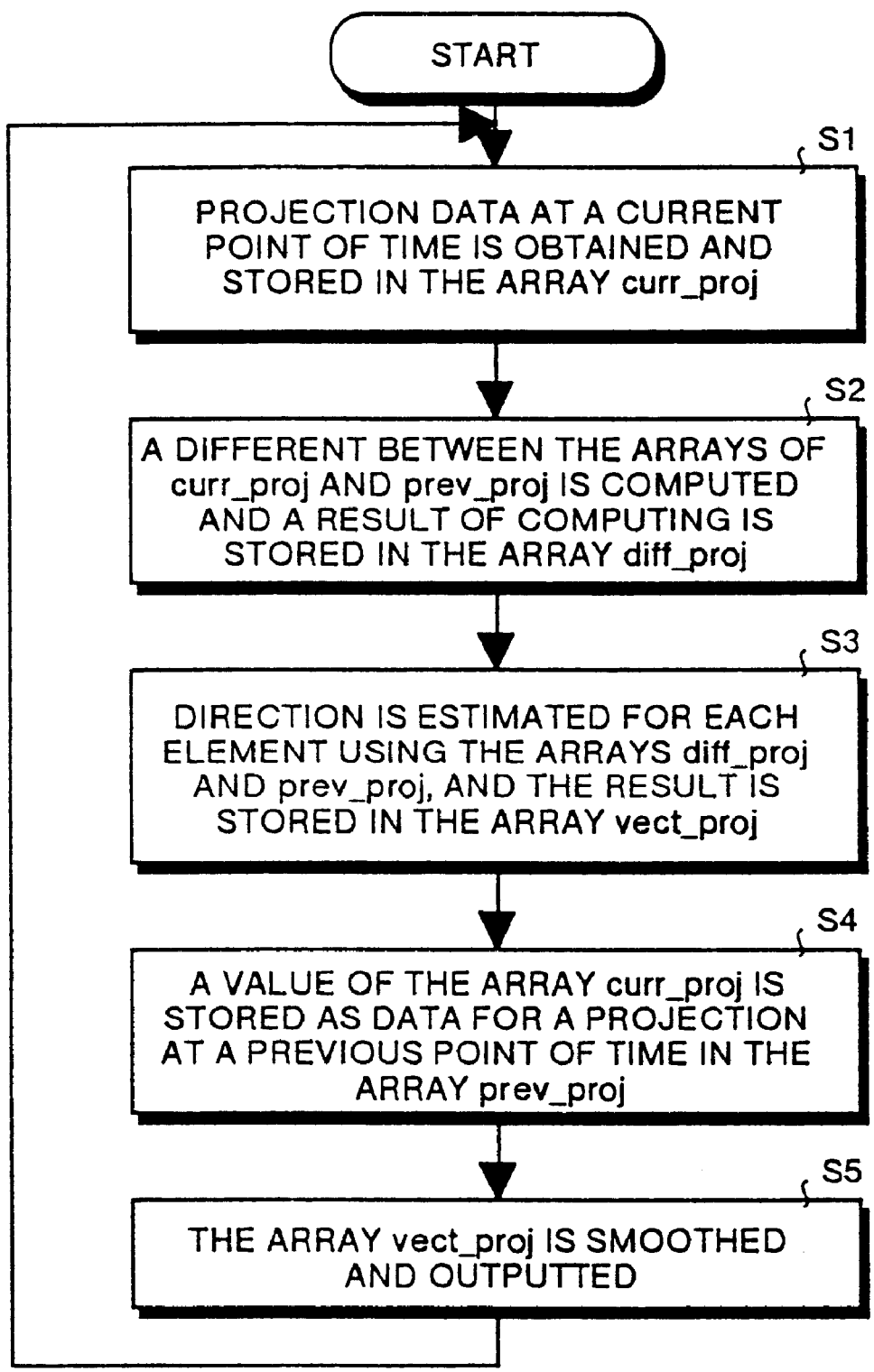

DIRECTION INSTRUCTING APPARATUS DIRECTION ESTIMATING APPARATUS AND A COMPUTER-READABLE STORAGE MEDIUM CONTAINING A PROGRAM FOR THE SAME STORED THEREON

FIELD OF THE INVENTION

The present invention relates to a method and apparatus for computing projections of a two-dimensional image, obtained using an image sensor as a whole, in a plurality of directions and estimating the direction of movement from a result of the computing, and to a computer-readable storage medium containing a program for the method.

BACKGROUND OF THE INVENTION

Description is made hereinafter for a direction instructing apparatus based on the conventional technology. For instance, in information equipment such as a personal computer, a pointer displayed on a screen is moved according to the movement of a mouse or the like used as a pointing device. Namely, a pointer displayed on a screen is moved according to, for instance, the direction of movement or the speed of the pointer computed from the coordinates (position) on a screen indicated by the pointer or the like as well as from rotation of a ball incorporated therein.

With the pointing device as described above, use thereof is limited to a space on a desk, namely it is necessary to secure an operational space, and the pointing device can not be operated in a small space such as that in, for instance, a running car. Even when the required space is available, if the space does not have a surface that gives a proper friction or if it has a vertical face (such as a wall surface), the ball in the mouse cannot rotate and the pointer on a screen cannot stably be operated.

To solve the problem as described above, it is conceivable to provide, for instance, an image sensor in a pointing device in order to move in instructing position (a pointer) on a screen to a particular position by computing the direction of movement of the image sensor itself from the movement of an image obtained by the image sensor according to a result of computing. With the method described above, it is possible to stably operate a pointer on a screen even at a surface which does not provide proper friction or on a vertical surface as if the pointer were operated on a desk.

To realize the pointing device as described above, it is necessary to estimate the movement of an image obtained by the image sensor as well as to move the pointer by updating a mouse position or a position (coordinates) of the pointer on the screen according to a result of estimation. As a technical document enabling the processing as described above, there is, for instance, Japanese Patent Laid-Open Publication No. HEI 9-134250 disclosing cursor position control on a video display unit. In the method disclosed in this document, a movement vector included in an image comprising 32×32 pixels is computed by means of correlational operation.

Generally, the resolution movement within one pixel can not be detected, therefore, in order to account for a relatively slow movement which can not be detected at this resolution, it is necessary to raise the resolution of the image itself. Thus, in order to respond to the relatively slow movement as described above in the positional control as disclosed in the technical document above, it is necessary to increase the number of calculations required for a correlational operation for a movement vector and memory capacity of an image buffer according to a resolution shown by N×N pixels.

As described above, with the conventional technology, a cursor or the like on a screen can be controlled by computing a movement vector included in an image consisting of N×N pixels according to an image picked up with an image sensor by means of a correlational operation.

With the conventional technology as described above, however, the number of calculations required for correlational operations for a movement vector increases according to an improvement in the resolution of the image sensor, so that a more expensive CPU is required for high speed operation. Further, capacity of the memory which stores the image data and a result of computing also increases according to an improvement in the resolution of the image sensor, so that a memory with a larger capacity is required. Therefore, with the conventional technology, there occurs the problem that low cost packaging of a pointing device is difficult.

SUMMARY OF THE INVENTION

It is an object of the present invention to obtain a direction instruction apparatus which does not require a special operation space and can operate a pointer on a screen, even on a surface which does not provide proper friction or a vertical surface, and also which enables low cost packaging using a low price CPU and a small capacity memory, a direction estimating method applicable for the apparatus, and a computer-readable storage medium containing a program for the method.

With the present invention, from two-dimensional image data obtained with an image sensor, projections of the two-dimensional image as a whole in a plurality of directions are computed, and a one-dimensional movement vector for each projection is computed from the computed projections. Then a two-dimensional movement vector for the two-dimensional image as a whole is estimated from the plurality of one-dimensional movement vectors. As described above, with the direction instructing apparatus, a two-dimensional movement vector is not directly computed from pixel data for a two-dimensional image like in the conventional technology, but at first, projections for a two-dimensional image are computed, and then the two-dimensional movement vector is estimated. More specifically, a two-dimensional movement vector is not computed directly from, for instance, 32×32 (=1024) pixel data, but at first 32 rows+32 columns (=64) projections are computed, and then the two-dimensional movement vector is estimated.

Therefore, in the direction instructing apparatus according to the present invention, a number of data can substantially be reduced and in association with this number of calculations performed by the CPU and a memory capacity for storing data can largely be reduced. In other words, a cheaper CPU and memory can be packaged and a function of a pointing device can be realized with a low cost system. Further, as number of calculations performed by the CPU and a memory capacity for storing the data can largely be reduced, the computing speed can be increased. In addition, where the direction instructing apparatus according to the present invention is used as a mouse, this mouse operates based on recognition of movement by means of image processing, so that it is not necessary to secure any special operating space, and further it is possible to stably operate a pointer on a screen even at a surface which does not provide proper friction or even at a vertical surface.

With the invention, for instance, when a pointer is displayed at a position on a screen, positional information represented by coordinates (positional information for a pointer being currently displayed) is updated according to a two-dimensional movement vector estimated by a direction estimating unit, and the position of the pointer on a screen is moved to the updated coordinate position according to positional information represented by the updated coordinates as well as to a size of the vector (speed of movement). With this configuration, the direction instructing apparatus according to the present invention can realize a mouse which does not require any specific operating space, and further a pointing device pointing a point on a screen used in a conference or during a lecture (corresponding to a conventional type of pen-light or stick) or a pointing device for game operation (used for operation in a shooting game or a game in which a characters are moved) can be realized by using the two-dimensional image and also by utilizing the characteristics that a pointer or the like displayed on the screen can be moved.

With the present invention, from the data for a two-dimensional image obtained with an image sensor, projections for the two-dimensional image as a whole in a plurality of directions are automatically outputted, and a one-dimensional movement vector for each projection is computed from the projections. Then, a two-dimensional movement vector for the two-dimensional image as a whole is estimated according to the plurality of one-dimensional movement vectors. As described above, with the direction instructing apparatus according to the present invention, as described above, a two-dimensional movement vector is not directly computed from pixel data of the two-dimensional image, but at first projections for the two-dimensional image are obtained, and then the two-dimensional movement vector is estimated. To explain more specifically, a two-dimensional movement vector is not computed directly from, for instance, 32×32 (=1024) pixel data, but at first projections for 32 rows+32 columns (=64) are obtained, and then the two-dimensional movement vector is estimated.

Because of this configuration, with the direction instructing apparatus according to the present invention, a number of data can largely be reduced and in association number of calculations performed by the CPU and a memory capacity for storing the data can substantially be reduced. In other words, a cheaper CPU and memory can be packaged and a function of a pointing device can be realized with a lower cost system. Further as the number of calculations performed by the CPU and a memory capacity for storing the data can substantially be reduced, the computing speed can be increased. In addition, when the direction instructing apparatus according to the present invention is used as a mouse, this mouse operates based on recognition of movement by means of image processing, so that, different from a mechanical mouse with a track ball used in the conventional technology, it is not necessary to secure any specific operating space, and further it is possible to stably operate a pointer on a screen even at a surface which does not provide proper fraction or on a vertical surface.

With the invention, it is not necessary to compute with a movement computing unit a difference between a projection output at a current point of time and that at a previous point of time. Therefore, in this direction instructing apparatus according to the present invention, number of calculations by a CPU can further substantially be reduced, and operations can speedily be realized.

With the present invention, for instance, an artificial retina LSI operating as a semiconductor integrated circuit automatically outputs, from data for a two-dimensional image obtained with an image sensor, at least either one of projections for the two-dimensional image as a whole in a plurality of directions or a difference between a projection output at a current point of time and that at a previous point of time. Therefore, in the direction instructing apparatus according to the present invention, number of calculations performed by the CPU can further substantially be reduced, and also a total volume of required software can substantially be reduced.

With the present invention, when a pointer is displayed at a position on a screen, positional information represented by coordinates (positional information for a pointer being currently displayed) is updated according to a two-dimensional movement vector estimated by a direction estimating unit, and the position of the pointer on a screen is moved to the updated coordinate position according to positional information represented by the updated coordinates as well as to a size of the vector (speed of movement). Therefore, the direction instructing apparatus according to the present invention can realize a mouse which does not require a specific operating space, and further realize a pointing device pointing a position on a screen in a conference or during a lecture (corresponding to a peen-light or stick based on the conventional technology) or a pointing device for game operations (operations in a shooting game or a game in which characters are moved) by making use of the capability of moving a pointer or the like displayed on a screen.

With the present invention, at first, projections for a two-dimensional image in a plurality of directions at a current point of time are stored, and then a difference between a projection output at this current point of time and that at a previous point of time previously stored is computed, a one-dimensional movement vector for each projection is computed from the difference, and then these one-dimensional movement vectors are smoothed and outputted. Finally, a two-dimensional movement vector for the two-dimensional image as a whole is estimated by synthesizing the plurality of smoothed one-dimensional movement vectors.

With this method, the direction instructing apparatus according to the present invention can substantially reduce a required number of data, and in association with this makes it possible to substantially reduce number of calculations performed by the CPU as well as a memory capacity for storing the data, so that: it is possible to realize a function such as that of a pointing device with a low cost system. Further, as the number of calculations performed by the CPU and the memory capacity for storing the data can substantially be reduced, also a higher processing speed can be realized. In addition, when the direction instructing apparatus according to the present invention is used as a mouse by using this method, this mouse operates based on recognition of movement by means of image processing, so that, different from a mechanical mouse with a track ball based on the conventional technology, it is not necessary to secure a specific operating space, and further it is possible to stably operate a-pointer on a screen even at a surface which does not provide proper friction or on a vertical surface.

With the present invention, a computing algorithm for a one-dimensional movement vector can be clarified. Therefore, it becomes possible to easily and accurately compute a one-dimensional movement vector.

With the present invention, a program makes it possible to at first store projections for a two-dimensional image in a plurality of directions at a current point of time, then compute a difference between a projection output at the current point of time and that at a previous point of time, compute a one-dimensional movement vector for each projection from the difference, and finally smooth and output the one-dimensional movement vectors. Finally, the program makes it possible to estimate a two-dimensional movement vector for the two-dimensional image as a whole by synthesizing the plurality of smoothed one-dimensional movement vectors.

When this program is executed, as it is possible, with the direction instructing apparatus according to the present invention to substantially reduce a number of data and in association with this substantially reduce the number of calculations performed by the CPU as well as a memory capacity for storing data. In other words, it is possible to package therein a cheaper CPU and memory, and a function of a pointing device can be realized with a low cost system. Further, as it is possible to substantially reduce the number of calculations performed by the CPU and a memory capacity for storing the data, also high speed processing can be realized. In addition, when this program is down-loaded and the direction instructing apparatus according to the present invention is used as a mouse, this mouse operates based on recognition of movement by means of image processing, so that, different from a mechanical mouse with a track ball based on the conventional technology, it is not necessary to secure a specific operating space, and also it is possible to stably operate a pointer on a screen even at a surface which does not provide proper friction or on a vertical surface. Moreover, as the program can be down-loaded from a computer, it is possible to easily change or add a program.

With the present invention, a computing algorithm for a one-dimensional movement vector is clarified. Therefore, it becomes possible to easily and accurately compute a one-dimensional movement vector. In addition, the program can be downloaded from a computer and hence it is possible to easily change or add a program.

Other objects and features of this invention will become apparent from the following description with reference to the accompanying drawings.

BRIEF DESCRIPTION OF THE DRAWING

FIG. 3 is an explanatory view showing a change in movement of a projection and in a projection value for computing a one-dimensional movement vector;

FIG. 4A, FIG. 4B, and FIG. 4C are views showing an example of a projection at a previous point of time and that at a current point of time and an estimated direction of the one-dimensional movement vector;

FIG. 5 is a flow chart showing a method of computing a one-dimensional movement vector in the direction instructing apparatus according to the present invention;

DESCRIPTION OF THE PREFERRED EMBODIMENTS

Detailed description is made hereinafter of embodiments of a direction instructing apparatus, a direction estimating method, and a computer-readable storage medium containing a program for the method, each according to the present invention, with reference to the related drawings. It should be noted that the present invention is not limited by these embodiments.

Figure 1:
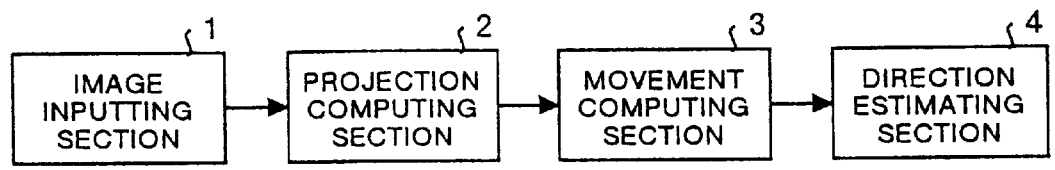
FIG. 1 is a block diagram showing an Embodiment 1 of a direction instructing apparatus according to the present invention.

FIG. 1 is a block diagram showing configuration of Embodiment 1 of a direction instructing apparatus according to the present invention. In FIG. 1, the direction instructing apparatus according to the present invention comprises an image inputting section 1 including an image sensor for inputting data for a two-dimensional image picked up with the image sensor, a projection computing section 2 for computing projections for the two-dimensional image as a whole according to the data inputted into the image inputting section 1, a movement computing section 3 for computing a one-dimensional movement vector for each projection according to the projection computed in the projection computing section 2, and a direction estimating section 4 for estimating a two-dimensional movement vector for the picked-up two-dimensional image according to the one-dimensional movement vector computed in the movement computing section 3.

Figure 2:
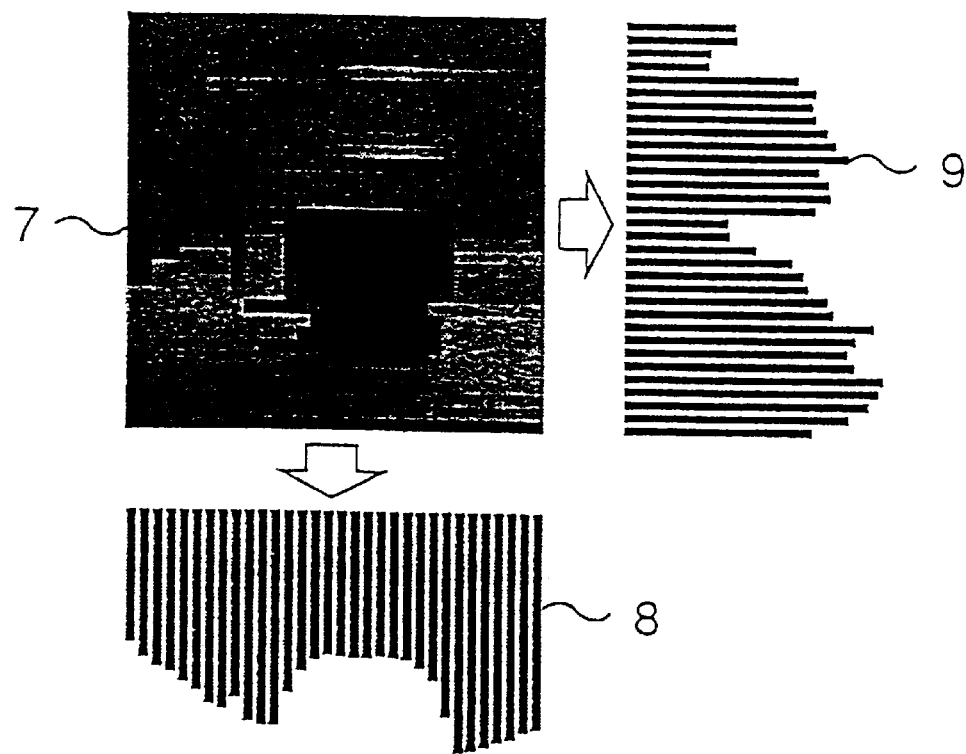
FIG. 2 is an explanatory view showing one example of a picked-up two-dimensional image as well as of a column projection and a row projection thereof.

Description is made for operations of the direction instructing apparatus having the configuration as described above. At first, FIG. 2 shows an input image consisting of 32×32 pixels picked up by the image inputting section 1 as well as a column projection and a row projection computed by the projection computing section 2. As shown in FIG. 2, in the projection computing section 2, by computing a total sum of pixel values for a two-dimensional image 7 picked up by the image inputting section 1 in a column direction and a row direction, the row projections 8 and column projections 9, namely 64 projections are outputted. Although the above description of this embodiment assumes use of an image sensor which can pick up a two-dimensional image consisting of 32×32 pixels, the number of pixels which can be picked up is not limited to the above number, and changes according to the efficiency of the image sensor can be incorporated therein.

Computation for a one-dimensional movement vector by the movement computing section 3 is executed according to the one-dimensional optical flow algorithm (Refer to FIG. 6) described hereinafter. Herein description is made of principles in computing for a one-dimensional movement vector.

FIG. 3 shows how a one-dimensional movement vector is calculated, and shows cases, in each of which each element of a projection (indicating each of 64 projections) is regarded as one pixel and a contrast, prepared according to three adjoining pixel values (described as contrast edge), moves right and left. The thin line in the figure shows a projection at a previous point of time and the bold line indicates a projection at a current point of time. The reference numeral 50 indicates a pixel value in the bright side, while the reference numeral 10 indicates a pixel value in the darker side.

In FIG. 3, (a) and (b) show a change of a projection value when a contrast edge moves from left to right, while (b) and (d) show a change of a projection value when the contrast edge moves from right to left. This shows that there are the following three principles between a change of-a projection value (pixel value) and movement of a projection for a direction of movement at a projecting position.

(I) At any projecting position, when a change in the projection value is zero (0), or when a current point of time or a previous point of time is selected as a reference point of time, even if a projection value changes and two adjoining projection values at the reference point of time have the same projection values, the direction of movement is estimated as zero (indicating no movement).

(II) At any projecting position, when a change in the projection value is positive, the direction of movement is estimated for a smaller one of two adjoining projection values at the reference point of time.

(III) At any projecting position, when a change of a projection value is negative, the direction of movement is estimated for a larger one of two adjoining projection values at the reference point of time.

FIG. 4A, FIG. 4B, and FIG. 4C are views showing an example of a projection at a previous point of time, at a current point of time and an estimated direction of the one-dimensional movement vector respectively. Next, description is made for a way to obtain a one-dimensional movement vector (namely, a one-dimensional optical flow) from a difference between a projection value at a previous point of time and that at a current point of time with reference to FIGS. 4A, FIG. 4B and FIG. 4C FIG. 4A and FIG. 4B each show an example of a projection value consisting of 8 elements, and show a projection value at a previous point of time and that at a current point of time, respectively. FIG. 4C is a table to specifically explain how the above-described three principles are applied to each array element in each projection. It is assumed herein for simplifying description that each element has a value in a range from 10 to 50. Further, although the following description assumes a case where the reference point of time is a previous point of time, a similar result can also be obtained by selecting a current point of time as the reference point of time.

At first, as for element #1, as a difference between a projection value at a previous point of time and that at a current point of time is zero, it can be determined from the principle (I) that the estimated direction is zero (0). Next, as for element #2, as the difference described above is a negative value, it is determined from the principle (III) that the estimated direction is from #2 to #3. Similarly for the elements #3 and #4, the estimated directions are from #3 to #4 and from #4 to #5 respectively. Then, as for element #5, although the difference is a positive value, as the element #4 and element #6 have the same value in the projection at the previous point of time, it is determined from the principle (I) that the estimated direction is zero (0). Then, as for element #6, as the difference is a positive value, it is determined from the principle (II) that the estimated direction is from #6 to #7. Similarly as for element #7, it is determined that the estimated direction is from #7 to #8. Finally, as for element #8, although the difference is a positive value, there is no adjoining element in the projection at the previous point of time, so that a direction cannot be estimated.

Principles in computing a one-dimensional movement vector were as described above, and now description is made for operations of the movement computing section 3 making use of the principles with reference to the related drawings. FIG. 5 shows operations of the movement computing section 3 for computing a one-dimensional movement vector in the direction instructing apparatus according to the present invention. As for column projections and row projections computed in the projection computing section 2, the one-dimensional movement vector is computed with this same algorithm, so that the two types of projections are not differentiated from each other in the following description.

In the movement computing section 3, at first, a projection outputted from the projection computing section 2 is obtained, and the projection is stored as a projection at the current point of time in the array curr_proj (step S1). Then, the movement computing section 3 computes the array curr_proj and the array prev_proj wherein the projection at the previous point of time is stored, and stores the result in the array diff_proj (step S2). Then, computing for a one-dimensional movement vector is executed for each element using the array diff_proj and array prev_proj, and all of the results are stored in the array vect_proj (step S3). Details of the operations for computing the one-dimensional movement vector are described later.

After all of the one-dimensional movement vectors are computed, the movement computing section 3 stores the array curr_proj as a projection at the previous point of time in the array prev_proj (step S4). Finally, to remove the noise in the one-dimensional movement vectors obtained in step S3, the array vect_proj is smoothed and outputted (step S5). Herein detailed description is made for computing a one-dimensional movement vector for each projection element in step S3 applying the principles described above. A process of computing an array index for a projection is described with reference to the flow chart in FIG. 6.

At first, the movement computing section 3 compares the array prev_proj [k−1] to the array prev_proj [k+1] to determine which of them has a higher value (step S11). When the two values are equal to each of other (step S12, YES), zero (0) is substituted into the array vect_proj [k] (step S13) and computing is terminated (A case of principle (I)). If the two values are not equal to each other (step S12, NO), of the array indices k and k+1, the one having a smaller value of array prev_proj is regarded as L, and the one having a larger value is regarded as G (step S14).

Then a sign of the array diff_proj [k] is checked, and if the value is zero (0) (step S15, YES), zero (0) is substituted into the array vect_proj [k] (step S13) and the computing is terminated (a case of principle (I)), and if the value is negative (step S15, NO; step S16, YES), the direction of k to G is selected (step S18, a case of principle (III)), while, if the value is position (step S15, NO; step S16, NO), the direction from k to L is selected (step S17, a case of principle (II)). And, in step S18 and step S17, if G (or L) is, for instance, k−1, −1 is substituted into the array vect_proj [k], and if G (or L) is k+1, +1 is substituted into the array vect_proj [k].

At last, the movement computing section 3 weights a value of the array vect_proj [k] according to an absolute value of the array diff_proj [k] [step S19], and terminates the computing for a one-dimensional movement vector.

Figure 7:
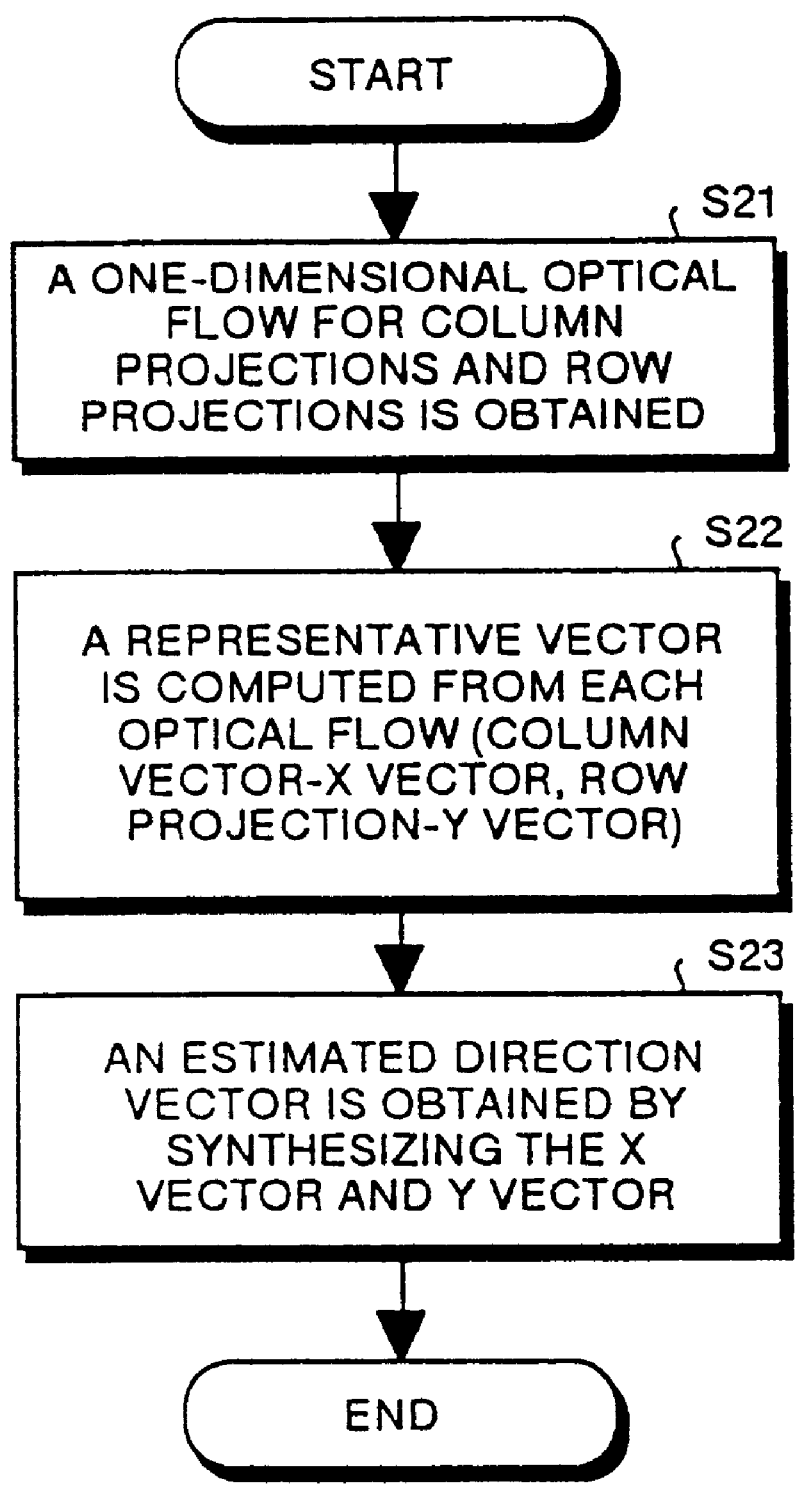
FIG. 7 is a flow chart showing a method of computing a two-dimensional movement vector in the direction instructing apparatus according to the present invention.

FIG. 7 shows a method of computing a two-dimensional movement vector in the direction instructing apparatus according to the present invention. The direction estimating section 4 executes processing for estimating a two-dimensional vector by estimating a representative vector from one-dimensional movement vectors for projections computed in the movement computing section 3 and A synthesizing the .representative vectors. Description is made for operations of the direction estimating section 4 with the flow chart in FIG. 7.

At first, the direction estimating section 4 obtains one-dimensional movement vectors of column projections and row projections computed by the movement computing section 3 (step S21). Then, the direction estimating section 4 computes representative vectors from the one-dimensional movement vectors (step S22). It is assumed herein that representative vectors corresponding to the column projection and row projection are, for instance, X vector and Y vector, respectively. Also herein this representative vector is an average of one-dimensional movement vectors, each constituting an optical flow, but the method of computing a representative vector is not limited to the one described above, and one having the maximum norm of one-dimensional movement vectors, each constituting an optical flow, may be selected as a representative vector. Then, finally the X vector and Y vectors are synthesized to estimate a vector relating to the two-dimensional movement of the originally picked-up two-dimensional image as a whole (step S23).

Figure 6:
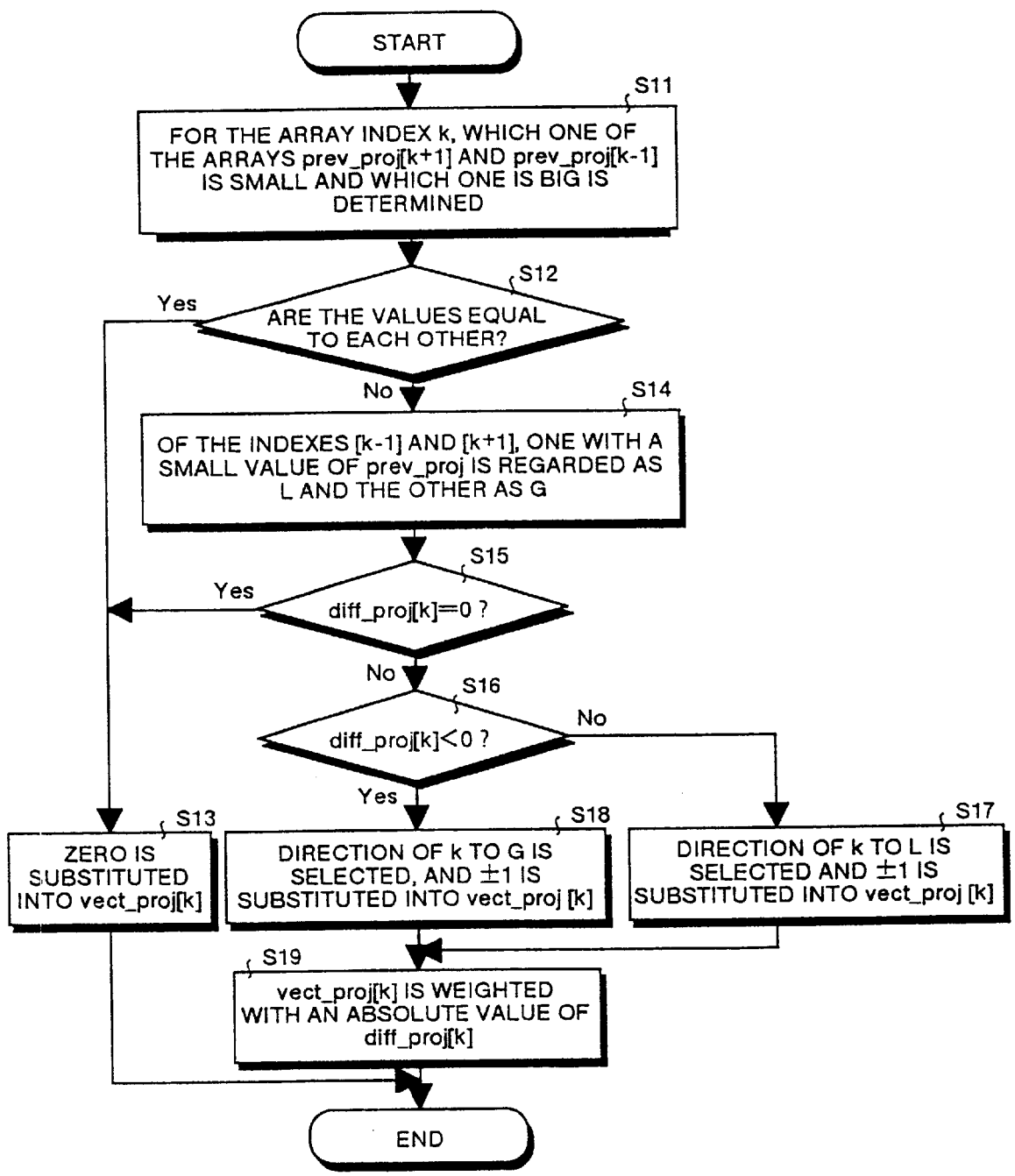
FIG. 6 is a flow chart showing a detailed algorithm for computing a one-dimensional movement vector.

As described above, the processing for estimating a two-dimensional vector executed in the direction instructing apparatus according to the present invention is realized as shown in the flow charts (a program for instructing a direction) in FIG. 5, FIG. 6 and FIG. 7, and the program is provided in a storage medium as described later.

As described above, with the direction instructing apparatus according to the present invention, a two-dimensional vector is not computed directly from pixel data for a two-dimensional image as in the conventional technology, but, at first, projections for a two-dimensional image are obtained, and then the two-dimensional movement vector is estimated. To describe specifically, a two-dimensional movement vector is not computed directly from data consisting of, for instance, 32×32 (=1024) pixels, and projections for 32 rows+32 columns (=64) obtained, and then the two-dimensional movement vector estimated.

Thus, with the direction instructing apparatus according to the present invention, the number of data can substantially be reduced, and in association with it, the number of calculations performed by the CPU and a memory capacity for storing the data can largely be reduced. In other words, a cheaper CPU and a memory can be incorporated therein, so that it is possible to realize such a function as a pointing device. Further, as the number of calculations performed by a CPU and a memory capacity for storing the data can largely be reduced, also high speed processing can be realized. In addition, when the direction instructing apparatus according to the present invention is used as a mouse, this mouse operates based on recognition of movement by means of image processing, different from a mechanical mouse with a track ball based on the conventional technology, it is not necessary to secure a specific operating space, and further a pointer on a screen can stably be operated even on a surface which does not provide proper friction or on a vertical surface.

Figure 8A:
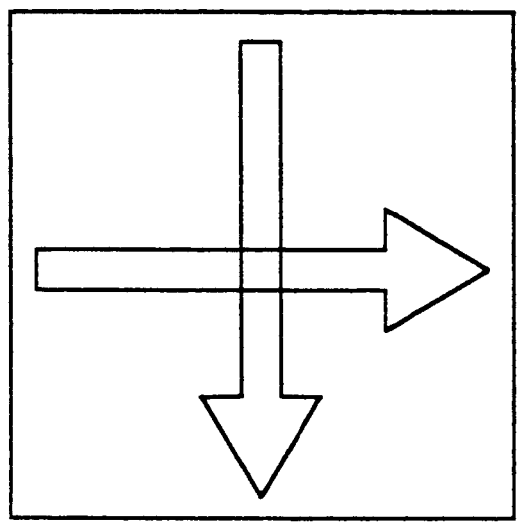
FIG. 8A, FIG. 8B and FIG. 8C are explanatory views showing a particular example of a computed projection.
Figure 8B:
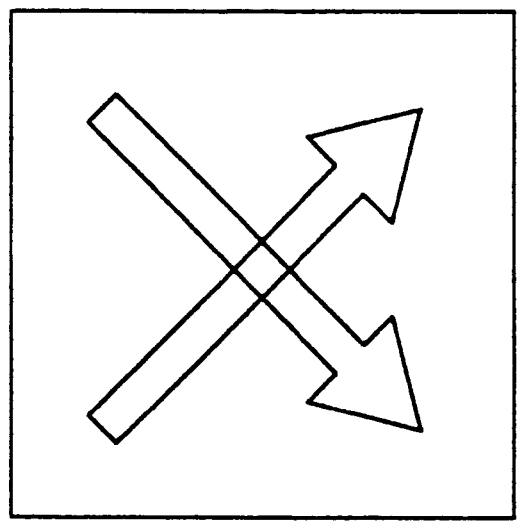
Figure 8C:
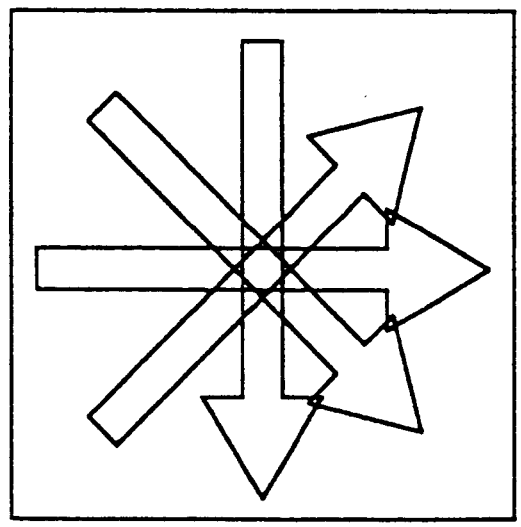

Description of the embodiment above assumed a case where projections for a picked-up image in the column direction and row directions are computed as shown in FIG. 8A, but the method of computing projections is not limited to the above-described one, and a two-dimensional vector may be estimated after projections in the diagonally downward direction and in the diagonally upward direction are computed as shown in FIG. 8B, and further, as shown in FIG. 8C, a two-dimensional movement vector may be estimated after projections in all of row, column, diagonally upward, and diagonally downward directions are computed, or after those in three arbitrary directions are computed.

Figure 9:
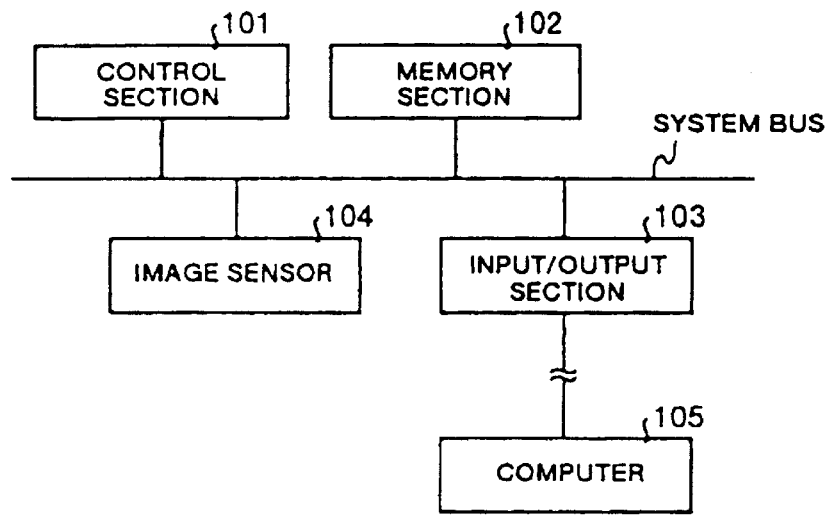
FIG. 9 is a block diagram showing general configuration of a direction instructing apparatus incorporating an image sensor and a direction estimating program.

FIG. 9 is a block diagram showing general configuration of a direction instructing apparatus incorporating therein an image sensor and a direction estimating program. In FIG. 9, the direction instructing apparatus comprises a control section 101 containing a CPU for executing a direction estimating program, a memory section 102 including a memory such as a RAM or a ROM for storing a program to be executed by the control section 101 and necessary data obtained during processing or the like, an input/output section 103 connected to a computer 105 such as a personal computer for outputting a two-dimensional movement vector, and an image sensor 104 for picking up a two-dimensional image, and the components are connected via a system bus to each other.

In the direction instructing apparatus having the configuration as described above, the control section 101 (CPU) executes the program described above according to a program stored in the memory section 102. The program for estimating a direction may be stored in a CD-ROM, and in this case, the program is downloaded from the computer 105 into the memory section 102 of the mouse.

The description above assumed a case where this program is provided with a ROM, a RAM, or a CD-ROM, but the storage medium is not limited to the above-described ones, and other storage medium such as a magnetic, such as a floppy disk, a photo-magnetic disk, or a magnetic tape may be used according to a type of computer used in the system.

Figure 10:
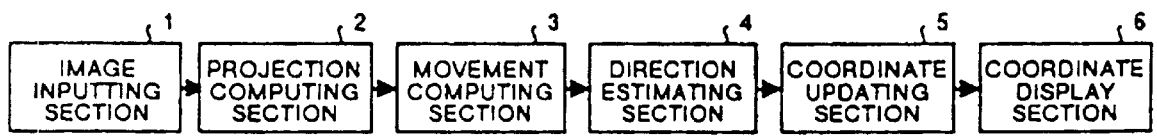
FIG. 10 is a block diagram showing an Embodiment 2 of the direction instructing apparatus according to the present invention.

FIG. 10 is a block diagram showing an Embodiment 2 of the direction instructing apparatus according to the present invention. The same reference numerals are assigned to the same components as those in Embodiment 1 and description thereof is omitted herein, and also description of the same operations is omitted. It is assumed herein that the same program as that used in Embodiment 1 is used in Embodiment 2.

In FIG. 10, the direction instructing apparatus according to the present invention comprises, in addition to the components in Embodiment 1, a coordinate updating section 5 for updating positional information represented by coordinates according to the two-dimensional vector estimated in the direction estimating section 4, and a coordinate displaying section 6 for displaying the position on a screen according to the positional information represented by the coordinates.

In the direction instructing apparatus having the configuration as described above, the coordinate updating section 5 has a memory for displaying coordinates, and coordinates of a pointer are updated by adding a two-dimensional movement vector outputted from the direction estimating section 4 to coordinates of the pointer on the screen currently being stored on the memory. Further, the coordinate displaying section 6 has a screen for displaying a pointer thereon, and displays a pointer on the screen according to the coordinates updated by the coordinate updating section 5.

Figure 11:
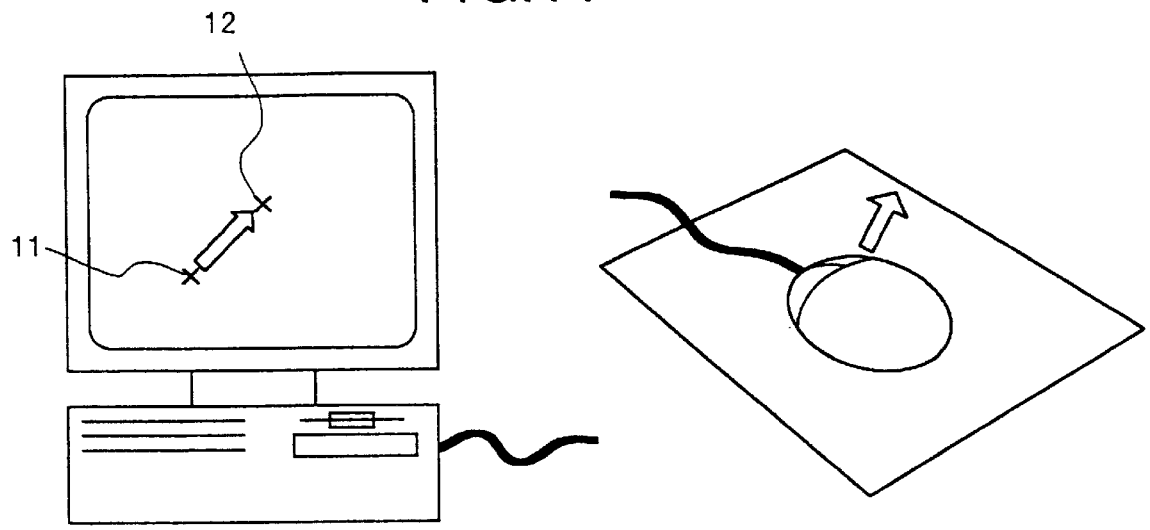
FIG. 11 is an explanatory view showing a particular example of Embodiment 2.
Figure 12:
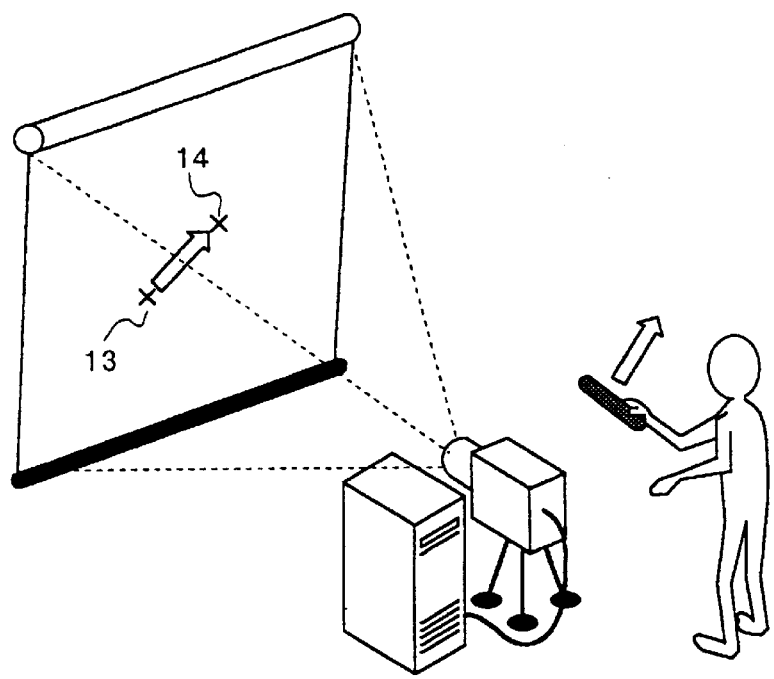
FIG. 12 is an explanatory view showing a particular example of Embodiment 2.

FIG. 11 and FIG. 12 show examples of use of the present invention. FIG. 11 shows a case where the configuration according to this embodiment is applied to a mouse as an interface for a personal computer. In this case, the mouse incorporates therein a direction instructing program and an image sensor as described in Embodiment 1, and for instance, when the mouse is moved on a surface in the direction as indicated by an arrow, and output information for the direction instructing program outputted from the mouse, namely the two-dimensional movement vector, is inputted via a cable into a computer having the functions of the coordinate updating section 5 and coordinate displaying section 6.

In the coordinate updating section 5, coordinates of a pointer stored in a memory in the computer are updated according to the method described above, and the pointer on the screen is moved from position 11 to position 12 according to the updated coordinates. Although the above description of this embodiment assumed a case where the mouse is operated on a desk as in the conventional technology, movement of the mouse can be optically picked up, so that actually there is no restriction over a place for operating the mouse.

FIG. 12 shows a case different from that shown in FIG. 11, and in this case the configuration according to the present invention is applied to a pen used for indicating a point on a screen, for instance, during a lecture. In this case, the pen incorporates the direction instructing program and an image sensor described in Embodiment 1, and for instance, when a person (a lecturer) moves the pen in a space in the direction as indicated by an arrow, output information for the direction instructing program is outputted from the pen, namely the two-dimensional vector is inputted through radio communications or the like into a computer having the functions of the coordinate updating section 5 and coordinate displaying section 6 incorporated therein.

Then, in the coordinate updating section 5, coordinate values of the pointer stored in a memory in the computer are updated according to the method described above, and in the coordinate displaying section 6, the pointer displayed on the screen is moved from position 13 to position 14 according to the updated coordinates. It should be noted that the pointer instructed with the pen is displayed via a projector, realizing a function of the coordinate displaying section 6, on a screen.

As described above, in this embodiment, there are provided, in addition to components in Embodiment 1, the coordinate updating section 5 and coordinate displaying section 6, so that it is possible to realize a mouse which does not require a special space for operation, and also it is possible to realize a pointing device (equivalent to a pen light or a stick in the conventional technology) for indicating a particular position on a screen used in a conference or during a lecture by making use of the capability of moving a pointer or the like displayed on a screen. Also by making use of the characteristics described above, also it is possible to realize a pointing device for operations in a game (for operations in a shooting game or in a game where characters are moved).

Figure 13:
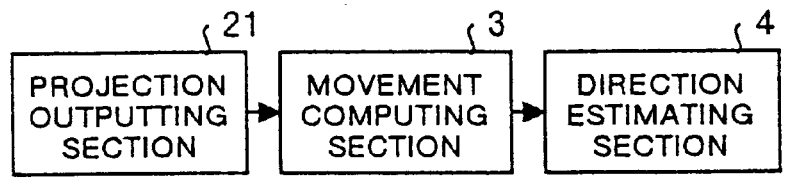
FIG. 13 is a block diagram showing an Embodiment 3 of the direction instructing apparatus according to the present invention.

FIG. 13 is a block diagram showing an Embodiment 3 of the direction instructing apparatus according to the present invention. In the description of Embodiment 3, the same reference numerals are assigned to the same components as those in Embodiment 1 described above and description thereof is omitted therein, and also that description of the same functions as those in Embodiment 1 is omitted. Further, it is assumed herein that the same program as that used in Embodiment 1 is used also in Embodiment 3.

In FIG. 13, the direction instructing apparatus according to the present invention has a projection outputting section 21 in place of the image inputting section 1 and projection computing section 2 of Embodiment 1. The projection outputting section 21 is a semiconductor integrated circuit (such as an artificial retina LSI described later) for outputting, based on data for a two-dimensional image picked up with an image sensor having the image processing function, projections for the two-dimensional image as a whole in a plurality of directions and also for computing a difference between a projection output at a current point of time and that at a previous point of time. The projection output from the projection outputting section 21 is equivalent to the column projection and row projection shown in FIG. 2. Configuration is allowable in which the projection outputting section 21 outputs only projections in a plurality of directions relating to the two-dimensional image as a whole. In this case, operations in this embodiment are the same as those in Embodiment 1.

In the direction instructing apparatus having the configuration as described above, when the projection outputting section 21 outputs the difference described above, the movement computing section 3 computes a one-dimensional movement vector for each projection according to the difference.

Figure 14:
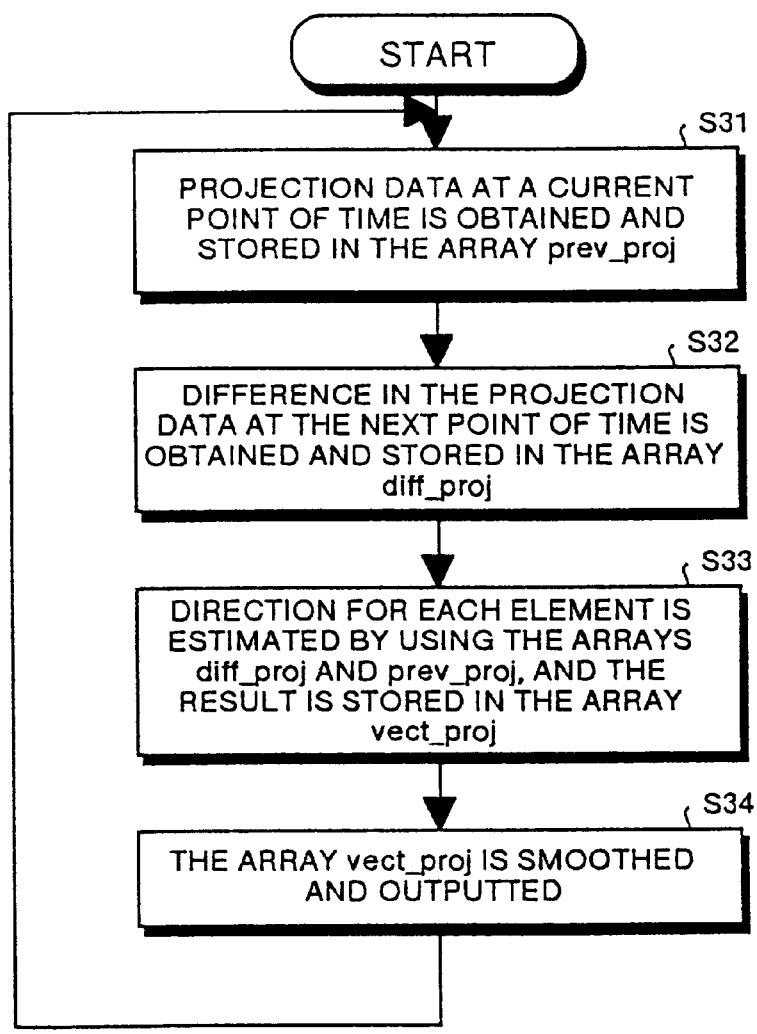
FIG. 14 is a flow chart showing a method of computing a one-dimensional movement vector in the direction instructing apparatus according to the present invention.

Next, description is made for operations of the movement computing section 3, when a difference between a projection at a current point of time and that at a previous point of time is computed, with reference to the flow chart in FIG. 14.

At first, in the movement computing section 3, a projection outputted from the projection outputting section 21 is obtained, and the projection is stored in the array prev_proj (step S31). Then the movement Computing section 3 obtains a difference outputted from the projection outputting section 21 between a projection at a previous point of time and that at a current point of time, and stores the difference in the array diff_proj (step S32). Then the movement computing section 3 computes a one-dimensional movement vector for each element using the array diff_proj and array prev_proj, and stores all of the results in the array vect_proj (step S33). Details of operations for computing a one dimensional movement vector are the same as those described in FIG. 6, and description thereof is omitted herein.

Then, finally the movement computing section 3 smoothes the array vect_proj to reduce noises in the one-dimensional movement vectors obtained in step S33 and outputs the smoothed array (step S34).

If the artificial retina LSI as disclosed, for instance, in the article With the tile of "Artificial Retinas—Fast, Versatile Image Processors" in "Nature" (Vol. 372, No. 6502, pp197–198, 1994), or in Japanese Patent Laid-Open Publication No. HEI 8-242265 as an image sensor included in the projection outputting section 2 in the direction instructing apparatus according to this embodiment, column projections and row projections can be directly outputted from an input image, so that it is possible to make the system realized in Embodiment 1 operate at a higher speed. Further, with the LSI described above, a processor required in processing in the latter stages can be replaced with a cheaper one, which makes it possible to reduce the system cost.

Figure 15:
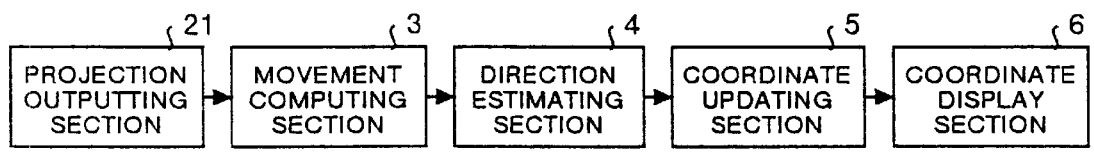
FIG. 15 is a block diagram showing an Embodiment 4 of the direction instructing apparatus according to the present invention.

FIG. 15 is a block diagram showing configuration in Embodiment 4 of the direction instructing apparatus according to the present invention. In description of Embodiment 4, the same reference numerals are assigned to the same components as those in Embodiment 3 and description of the same components as well as of the same operations is omitted herein. Also it is assumed in description of Embodiment 4 that the same program as that used in Embodiment 1 is executed.

In FIG. 15, the direction instructing apparatus according to the present invention comprises, in addition to the components in Embodiment 3, a coordinate updating section 5 for updating positional information representing coordinates according to the two-dimensional movement vector estimated in the direction estimating section 4, and coordinate displaying section 6 for displaying the position on a screen according to the positional information represented by the coordinates.

In the direction instructing apparatus having the configuration as described above, the coordinate updating section 5 has a memory for displaying coordinates, and coordinates for a pointer are updated by adding the two-dimensional movement vector outputted from the direction estimating section 4 to coordinates of a pointer on the screen stored in the memory,. Further, the coordinate displaying section 6 has a screen for displaying thereon a pointer, and displays a pointer on the screen according to the coordinates updated by the coordinate updating section 5. Examples of use of configuration according to this embodiment are, for instance, those shown in FIG. 11 and FIG. 12.

As described above, the direction instructing apparatus according to this embodiment has, in addition to the components of Embodiment 3, a coordinate updating section 5 and coordinate displaying section 6, so that it is possible to realize a mouse which does not require a special space for operations, and further it is possible to realize a pointing device for pointing a position on a screen in a conference or during a lecture (equivalent to a pen light or a stick in the conventional technology) by making use of a pointer or the like on a screen using a picked-up two-dimensional image. In addition, by using the characteristics described above, it is possible to realize a pointing device for operations in a game (shooting game or a game in which characters are moved).

As described above, with the present invention, it is possible to substantially reduce a number of data, and in association with this number of calculations performed by the CPU and a memory capacity for storing the data can largely be reduced, namely a cheaper CPU and memory can be used, and because of this feature there is provided the advantage that functions such as those of a pointing device or the like can be realized with a low cost system. Further, as the number of calculations performed by a CPU and a memory capacity for storing data can substantially be reduced, also there is provided the advantage that high speed operations can be realized. When the direction instructing apparatus according to the present invention is used as a mouse, this mouse operates based on recognition of movement by means of image processing, and because of this feature there is provided the advantage that, different from the mechanical mouse with a track ball in the conventional technology, it is not required to secure a special space for operations, and further a pointer on a screen can stably be operated on a surface that does not provide proper friction or on a vertical surface.

With the present invention, there is provided the advantage that it is possible to realize a mouse which does not require a special space for operations and further it is possible to realize a pointing device for pointing a position on a screen to be used in a conference or during a lecture (corresponding to a peen light or a stick in the conventional technology) or a pointing device for operations in a game (shooting game or a game in which characters are moved) by making use of the capability of moving a pointer or the like displayed on a screen using a picked-up two-dimensional image.

With another aspect of the present invention, a number of data can substantially be reduced, and in association with this number of calculations performed by a CPU and a memory capacity for storing data can largely be reduced, namely a cheaper CPU and memory can be used therein, and hence there is provided the advantage that it is possible to realize such functions as those of a pointing device or the like using a system with lower cost. Further, as the number of calculations performed by a CPU and a memory capacity for storing the data can largely be reduced, there is provided the advantage that higher speed operations can be realized. Further, when the direction instructing apparatus according to the present invention is used as a mouse, as this mouse operates based on recognition of movement by means of image processing, there is provided the advantage that, different from the mechanical mouse with a track ball in the conventional technology, it is not necessary to secure a special space for operations and further a pointer on a screen can stably by operated even on a surface that does not provide proper friction or on a vertical surface.

With another aspect of the invention, it is not necessary to compute a difference between a projection output at a current point of time and that at a previous point of time with a movement computing unit. Thus, in the direction instructing apparatus according to the present invention, number of calculations performed by a CPU can further substantially be reduced, and hence there is provided the advantage that operations can be realized with higher speed.

With another aspect of the present invention, for instance, an artificial retina LSI operating as a semiconductor integrated circuit automatically outputs, from data for a two-dimensional image picked up with an image sensor, at least either one of projections for the two-dimensional image as a whole in a plurality of directions or a difference between a projection output at a current point of time and at a previous point of time. With this feature, there is provided the advantage that, in the direction instructing apparatus according to the present invention, number of calculations performed by a CPU can further substantially be reduced, and also a total volume of required software can largely be reduced.

With another aspect of the present invention, there is provided the advantage that it is possible to realize a mouse which does not require a special space for operations, and also it is possible to realize a pointing device for pointing a position on a screen used in a conference or during a lecture (corresponding to a pen light or a stick in the conventional technology or a pointing device for operations in a game (such as the shooting game or that in which characters are moved) by making use of the capability of moving a pointer or the like displayed on a screen using a picked-up two-dimensional image.

With another aspect of the invention, by making use of the method described above, in the direction instructing apparatus according to the present invention, a number of data can largely be reduced, and in association with this number of calculations performed by a CPU and a memory capacity for storing data can largely be reduced, namely a cheaper CPU and memory can be used therein, and because of the features there is provided the advantage that it is possible to realize functions such as those of a pointing device with a low cost system. Further, as the number of calculations performed by a CPU and a memory capacity for storing data can largely be reduced, there is provided the advantage that operations can be realized with higher speed. Further, by using the method described above, when the direction instructing apparatus according to the present invention is applied as a mouse, as the mouse operates based on recognition of movement by means of image processing, there is provided the advantage that it is not required, different from a mechanical mouse with a track ball in the conventional technology, to secure a special space for operations and also it is possible to stably operate a pointer on a screen even at a surface that does not provide proper friction or a vertical surface.

With another aspect of the present invention, an algorithm for computing a one-dimensional movement vector is clarified. With this feature, there is provided the advantage that an accurate one-dimensional movement vector can easily be computed.

With another aspect of the present invention, as the program described above is executed, a number of data required in the direction instructing apparatus according to the present invention can substantially be reduced, and in association with this number of calculations performed by a CPU and a memory capacity for storing data therein can largely be reduced, namely a cheaper CPU and memory can be used therein, and because of the features described above there is provided the advantage that it is possible to realize functions as those of a pointing device or the like with a low cost system. Further, as the number of calculations performed by a CPU and a memory capacity for storing the data can largely be reduced, there is also provided the advantage that operations can be realized with higher speed. Further, when this program is downloaded and the direction instructing apparatus according to the present invention is used as a mouse, this mouse operates based on recognition of movement by means of image processing and does not require, different from the mechanical mouse with a track ball based on the conventional technology, a special space for operations, and there is provided the advantage that it is possible to stably operate a pointer on a screen even at a surface that does not provide proper friction or on a vertical surface. Further, as the program can be downloaded from a computer, there is provided the advantage that a program can easily be change or added.

With another aspect of the invention, an algorithm for computing a one-dimensional movement vector is clarified. With this feature, there is provided the advantage that an accurate one-dimensional movement vector can easily be computed. Further, as the program can be downloaded from a computer, there is provided the advantage that a program can easily be changed-or added.

For the reasons as described above, with the present invention, it is; possible to provide a direction instructing apparatus which does not require a special space for operations and enabling stable operation of a pointer on a screen even at a surface that does not provide proper friction or on a vertical surface, and which can be realized with low cost by using a low price CPU and a small capacity memory.

This application is based on Japanese patent application No. HEI 11-013422 filed in the Japanese Patent Office on Jan. 21, 1999, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A direction instructing apparatus comprising:

an image inputting unit for inputting data for a two-dimensional image obtained by an image sensor, wherein the two-dimensional image comprises an array of pixels, each pixel having a value related to brightness of the pixel;

a projection computing unit for computing projections in a plurality of directions for the two-dimensional image, wherein the projection computing unit computes the projections for each of the plurality of directions as a plurality of sums of the values of the pixels along each of a plurality of lines parallel to each of the directions;

a movement computing unit for computing a one-dimensional movement vector for each of the projections computed by said projection computing unit; and a direction estimating unit for estimating a two-dimensional movement vector for the two-dimensional image according to the one-dimensional movement vectors computed by said movement computing unit.

2. The direction instructing apparatus according to claim 1 comprising:

a coordinate updating unit for updating positional information representing coordinates according to the two-dimensional movement vector estimated by said direction estimating unit; and a coordinate displaying unit for displaying a position on a screen according to the positional information.

3. A direction instructing apparatus comprising:

a projection outputting unit for outputting projections, according to data for a two-dimensional image obtained by an image sensor having an image processing function, for the two-dimensional image in a plurality of directions, wherein the two-dimensional image comprises an array of pixels, each pixel having a value related to brightness of the pixel, and the projection outputting unit produces the projections for each of the plurality of directions as a plurality of sums of the values of the pixels along each of a plurality of lines parallel to each of the directions;

a movement computing unit for computing a one-dimensional movement vector for each of the projections outputted from said projection outputting unit; and a direction estimating unit for estimating a two-dimensional movement vector for the two-dimensional image according to the one-dimensional movement vectors computed by said movement computing unit.

4. The direction instructing apparatus according to claim 3, wherein said projection outputting unit further computes a difference between a projection output at a current point of time and a projection output at a previous point of time, and said movement computing unit computes a one-dimensional movement vector for each projection according to the difference.

5. The direction instructing apparatus according to claim 3 wherein said projection outputting unit is a semiconductor integrated circuit outputting one of projections of the two-dimensional image in an plurality of directions and a difference between a projection output at a current point of time and a projection output at a previous point of time.

6. The direction instructing apparatus according to claim 3 further comprising:
- a coordinate updating unit for updating positional information representing coordinates according to the two-dimensional movement vector estimated by said direction estimating unit; and
- a coordinate displaying unit for displaying a position on a screen according to the positional information.

7. A direction estimating method for a direction instructing apparatus estimating a direction of movement in a two-dimensional image picked up with an image sensor, the two-dimensional image comprising an array of pixels, each pixel having a value related to brightness of the pixel, the method comprising:
- computing projections for the two-dimensional image for each of a plurality of directions by summing the value of the pixels along each of a plurality of lines parallel to each of the directions;
- computing a difference between a projection output at a current point of time and a projection output at a previous point of time according to the projections of the two-dimensional image in a plurality of directions and computing a one-dimensional movement vector for each projection according to the difference; and
- estimating a two-dimensional movement vector of the two-dimensional image by synthesizing the one-dimensional movement vectors.

8. The direction estimating method for a direction instructing apparatus according to claim 7 wherein, in computing a difference,
- when a projection output at a position at a current point of time has not changed from a projection output at the position at a previous point of time, or when the projection output at a position at a current point of time has changed from a projection output at the position at a previous point of time, the current point of time or the previous point of time is selected as a reference point of time, and, where two adjacent projections at the reference point of time are identical, a direction is not estimated;
- when a difference between a projection output at a position at a current point of time and a projection output at the position at a previous point of time is positive, a direction is estimated for a smaller one of the two adjacent projections at the previous point of time;
- when a difference between a projection output at a position at a current point of time and a projection output at the position at a previous point of time is negative, a direction is estimated for a larger one of the two adjacent projections at the previous point of time; and
- one-dimensional movement vectors are computed after directions are estimated at all positions.

* * * * *